United States Patent
Millard (10) Patent No.: US 8,550,748 B2
(45) Date of Patent: *Oct. 8, 2013

(54) PARALLEL FISH PASSAGE APPARATUSES WITH HYDROELECTRIC POWER GENERATOR AND METHOD

(76) Inventor: Kenneth T. Millard, Maple Valley, WA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/189,561

(22) Filed: Jul. 25, 2011

(65) Prior Publication Data

US 2011/0280662 A1    Nov. 17, 2011

Related U.S. Application Data

(63) Continuation-in-part of application No. 12/437,738, filed on May 8, 2009, now Pat. No. 8,011,854.

(51) Int. Cl.
*E02B 8/08* (2006.01)
*E02B 9/00* (2006.01)

(52) U.S. Cl.
USPC .......................................................... 405/83

(58) Field of Classification Search
USPC ......... 405/75–78, 81, 83, 84; 60/398; 290/42, 290/43, 53, 54; 119/250
See application file for complete search history.

(56) References Cited

U.S. PATENT DOCUMENTS 6,739,802 B2 *    5/2004    Boylan ........................... 405/83

* cited by examiner

*Primary Examiner* — David Bagnell
*Assistant Examiner* — Kyle Armstrong
(74) *Attorney, Agent, or Firm* — Joseph Z. Ellsworth (57) ABSTRACT

An improved fish passage apparatus is combined with hydroelectric power generation to facilitate migration of fish between water bodies of different heights with minimal injury or trauma to fish. It may also be optimized for power generation when fish are not moving through it. The fish passage apparatus comprises parallel connecting tubes providing fluid communication between upper and lower water bodies, upper valves in each connecting tube adapted to control flow of water to or from an upper water body, lower valves in each connecting tube adapted to control flow of water to or from a lower water body, and working tubes opening into each connecting tube between the upper and lower valves a working portion of which extends functionally vertical to above a water level of the upper body of water and to below a water level of the lower body and is vented at its top such that water can flow freely in and out of the working portion.

14 Claims, 7 Drawing Sheets

PARALLEL FISH PASSAGE APPARATUSES WITH HYDROELECTRIC POWER GENERATOR AND METHOD

This application is a continuation in part of that certain application filed May 8, 2009 under application Ser. No. 12/437,738 now U.S. Pat. No. 8,011,854 and claims the benefit thereof.

BACKGROUND

1. Field of the Invention

This invention relates to tubes connected between two bodies of water of different elevations optimized for power generation, and more specifically to such a configuration adapted for fish migration between the bodies of water.

2. Prior Art

It is well known that power generators between bodies of water of different heights extract potential energy from the flow of water. Hydropower generation systems typically rely on water flow from dams through turbines that run generators. However, turbine based systems do not allow for fish migration beyond the dams or often injure fish passing through them. To avoid injury and death to fish passing dams, high cost systems are employed. Currently, the primary bypass methods are a series of pools as fish ladder apparatus for upstream migration and spillways for downstream migration. Unfortunately, these methods are also problematic due to passage delays, increases in dissolved gasses, fish de-scaling, fish disorientation, increased predation, injury and so forth. Further, they are only effective with head heights less than about 90 feet. For dams with a head of more than 90 feet, fish must be trapped and transported around or lifted over the dam due to excessive mortality rates and the inability of fish to completely climb the ladders.

It is an object of the present invention to provide a combination fish passage apparatus and hydropower generator that is conducive to fish migration with the least possible injury or trauma to the fish. It is another object that the combination be economically effective for head heights ranging from very small to very large. It is still another object that extraction of potential energy of the water between two bodies of water of different heights be optimized.

SUMMARY

These objects are achieved in the combination fish passage apparatus and power generator through an oscillating column of water as described herein which provides a connecting tube between two bodies of water with a pair of valves controlling water flow at the upper and lower bodies of water. When the upper valve is opened water surges from the upper body of water having significant potential energy in its momentum. To capture that energy a working tube, functionally vertical, is connected to the connecting tube between the valves. Flow of water to the lower body of water is interrupted with the lower valve closed thereby directing flow into the working tube. The momentum of the flow causes an overshoot of the water level in the working tube past the water level of the upper body of water by 50 percent or more before it falls back and then rises again in a wave-like decaying motion until eventually it equalizes at the water level of the upper body of water. That higher water level in the working tube may be captured by quickly closing the upper valve, thereby creating a head relative to the water level of the lower water body greater than that between the two bodies of water. The lower valve is then opened and the sudden release of water from the working tube causes the water level in the working tube to drop below the water level of the lower body of water in a similar wave-like decaying motion until the working tube water level equalizes with that of the lower body of water. Once the proper water level in the working tube is achieved, then the lower valve is closed and the upper valve can be opened again to start another cycle.

One or more power generation systems (hereinafter "generator" including all supporting structures and apparatus') are installed to operate in cooperation with the movement of the water in the working tube such that the generator may operate in the normal manner of an electricity generator as that water moves through a traditional generator. For these purposes, use of the term 'generator' is deemed to include any and all power takeoff mechanisms to convert water flow to rotation of a traditional generator, movement of a linear generator, movement of a point absorber, movement of air above the water as in a water piston, or other means for extracting energy such as piezoelectric devices, hydraulic and/or other weight induced generators, and turbines in combination with traditional electric generators, etc.

For a traditional generator, when the lower valve is opened quickly, water from the working tube surges out. It is that flow that operates the generator. All or virtually all of the potential energy captured in the working tube is extracted ideally when there is no or minimal flow to the lower water body, that is, all momentum from the initial surge from the working tube is extracted by the generator when the water level in the working tube reaches the water level of the lower body of water. Necessarily, for a traditional generator, the generator should be below the level of the lower water body and the working tube extends below the water level of the lower body of water. For a traditional generator it may also be important to rectify the water flow so that the back-flowing water does not flow against the turbine and potentially cause damage. By rectifying the bidirectional flow into a unidirectional flow, the rising surge in addition to the falling surge in the working tube will spin the generator. Although, by extracting energy from the surge as it rises or falls will ensure that the overshoot, if any, is minimal.

For other technologies that may be employed, the generator may be located as appropriate relative to the water flow and surge, which are deemed included in this representative description. That is, it is recognized that although this description is given in terms of water moving to the lower body of water, however, it should be understood that energy can also be extracted from water surging upwards into the working tube from the upper water body by suitably operating the upper and lower valves. These and all other manner of extracting potential energy from the upper body of water being at an elevation above the lower body of water are deemed included in the present description, which is deemed representative of all other such manner.

Valves of any appropriate design are suitable. Such valves may be based on butterfly, knife, slide, gate and diaphragm mechanisms for example, or any other and may be operated pneumatically, electrically, etc. or even manually. All are deemed included herein as possible mechanisms.

It is understood that when a traditional generator is not operating to extract energy from the working tube water flow, the surge of water out of the working tube when the lower valve is opened while the upper valve is closed will cause an overshoot downward past the water level of the lower body of water similar to the overshoot upward in the working tube above the upper body of water as described previously. That lower level can be captured by quickly closing the lower valve. This lower level will then be the effective lower level when the upper valve is opened which will cause an even greater overshoot in the working tube upward past the upper water body level. This cycle can be repeated until there is a maximum head in the working tube.

It is understood that this invention may be well implemented as providing an improved method of fish migration between two bodies of water, upstream and or downstream. In this implementation, it is important that the valves be opened and closed in such a manner as to not injure the fish. Experimentation has shown that this will likely require the valves to open and close less quickly, which will compromise to some extent the advantage described above in power generation. As illustrated in the figures, the fish will pass through the connecting tube between the valves without passing into the working tube. In fact, a screen or other device will be installed to prevent fish from entering the working tube thereby ensuring that fish are never in danger from a power takeoff system. In addition, portions of the connecting tube may also serve as resting places during fish passage.

Downstream migrating fish, during the first half of the cycle when the lower valve is closed and the upper valve opens allowing water to surge through the top-half of the connection tube, down through the fish screen, and into the working tube, simply drift with the current down to the fish screen. After arriving at the fish screen, the fish pass to the lower half of the connection tube, which during the first half of the cycle is still and has no motion. Fish that did not pass the fish screen before the working tube crests will then be forced back up the connection tube towards the upper valve as the falling level in the working tube will cause surging water to move back up the connection tube. This back and forth motion will occur as long as the motion in the working tube is not stopped by closing the upper valve. Once the upper valve is closed the motion will cease. Next, the second half of the cycle begins as the lower valve is opened. Water from the working tube will surge out of the working tube, out through the fish screen and down the lower half of the connection tube and out the lower valve carrying any fish in that area along with it. The lower valve is then closed and the cycle can begin again.

Upstream migrating fish need to swim past the lower valve while it is open during the second half of the cycle. As fish pass through the valve and into the lower connection tube against the current, the valve closes and the current stops while the fish continue towards the area of the fish screen. After passing the fish screen, the fish will be either pushed back towards the fish screen area or pushed upward toward the upper valve depending on the motion in the working tube. The whole upstream passage should take seconds or minutes instead of the hours or days currently required.

Energy generated from the water flow in the working tube can provide electrical energy to operate the valves and provide for other uses. Fish may be encouraged into, through and out of the tubes by any of various effective methods, such as use of light, slope of the connecting tube, water flow, etc.

Juvenile fish have a genetic cue that causes them to make their way down stream to the ocean or other large body of water to mature and become adults. They are born with innate knowledge of where to go and what clues will lead them downstream. In many instances, the juvenile fish use the motion of the water to find the way downstream. Most of the time the juvenile fish aren't swimming at all but rather, riding the current of the river or stream. That is until there is a dam and the water stops moving. Then the juvenile fish swim looking for a current that will take them down stream again.

It is the object of the present invention to provide a system that has a steady current that will attract juvenile fish and then won't allow an opportunity for them to turn back and leave the system. By putting two fish passage apparatuses in parallel one upper valve can close as the other upper valve opens and the flow of water from the upper body of water will be nearly continuous. Conversely, if the system is operated singly or in series, then while the upper valve is closed the flow above that valve would stop and allow the fish a chance to leave. However, by operating two units in parallel as a single system the flow above the upper valves would be nearly continuous and thereby ensure that the juvenile fish cannot leave once they have entered.

DETAILED DESCRIPTION OF THE PREFERRED EMBODIMENTS

Figure 1:
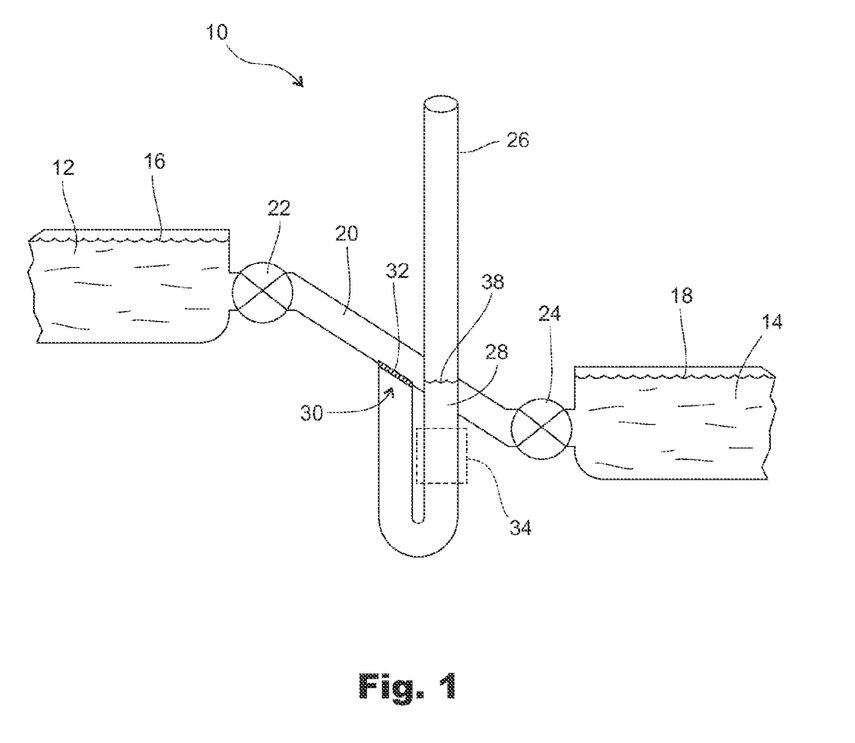
FIG. 1 is a diagram of a fish passage apparatus for control of water flow that facilitates fish migration between two bodies of water of different heights, including a working tube that generates power in cooperation with a power generator and contributes to moving fish between the bodies of water.

As shown in FIG. 1, the fish passage apparatus 10 of the present invention for fish passage between water bodies 12, 14 of different heights with different water levels 16, 18 comprises a connecting tube 20 providing fluid communication between upper and lower water bodies 12, 14, an upper valve 22 in the connecting tube 20 adapted to control flow of water to or from the upper water body 12, a lower valve 24 in the connecting tube 20 adapted to control flow of water to or from the lower water body 14, and a working tube 26 containing a column of water 28 with a surface level 38 opening into the connecting tube 20 between the upper and lower valves 22, 24 a working portion of which working tube 26 extends functionally vertical to above the water level 16 of the upper water body 12 and to below the water level 18 of the lower water body 14 and is vented at its top such that water can flow freely in and out of the working tube 26. A screen 30 covers the opening 32 of the working tube 26 at the junction of tubes 20, 26 such that fish are prevented from leaving connection tube 20 and entering the working tube 26.

When the upper valve 22 is opened with the lower valve 24 closed, water flows through the connecting tube 20 and flows into the working tube 26 raising the surface level 38 of the water column 28 to at least the water level 16 of the upper body of water 12 and allows for fish to enter the connecting tube 20 from the upper body of water 12. When the upper valve 22 then closes and the lower valve 24 opens, fish may flow with the current from the connecting tube 20 into the lower body of water 14 as the surface level 38 of the water column 28 in the working tube 26 lowers to at least the water level 18 of the lower body of water 14. Whereupon, the lower valve 24 closes and a new cycle can begin again with the opening of upper valve 22.

An electrical power generator 34 operates in cooperation with the working tube 26, adapted to extract potential energy from the column of water 28 in the working tube 26 as the upper and lower valves 22, 24 are suitably operated; which, for example of a traditional generator, as the column of water 28 falls when the upper valve 22 is closed while the lower valve 24 is opened, or but also alternatively when the upper valve 22 is opened while the lower valve 24 is closed and the column of water 28 rises.

Figure 2:
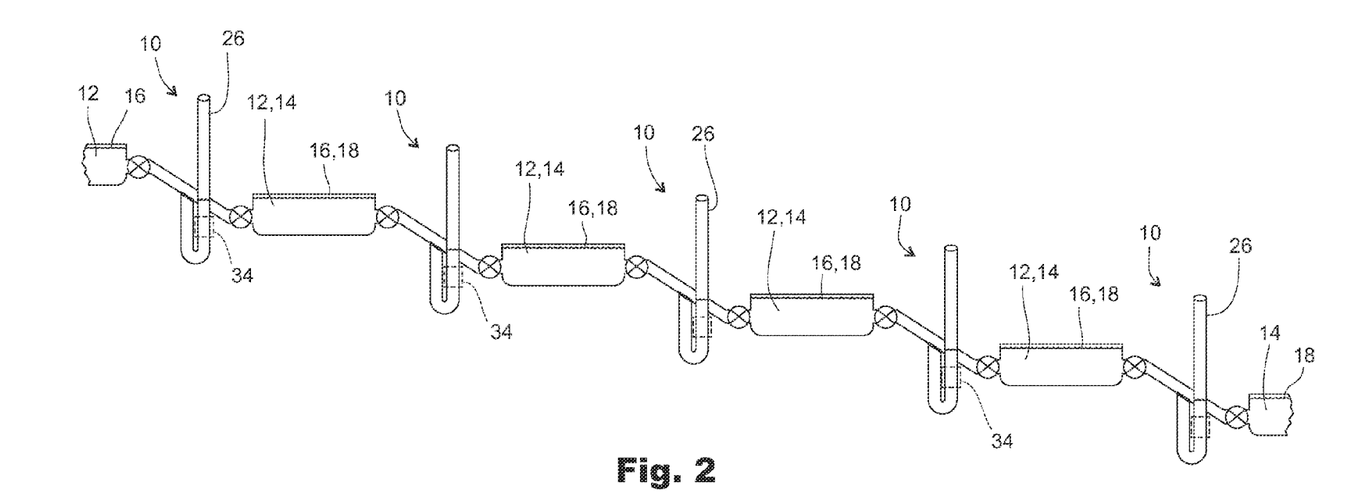
FIG. 2 is a diagram showing a plurality of fish passage apparatus of FIG. 1 connected in series.

Clearly, a plurality of said fish passage apparatus 10 may be combined in series where an upper body of water 12 of one of said plurality of fish passage apparatus 10 is a lower body of water 14 of a next higher fish passage apparatus until the final upper body of water 12 is reached, as shown in FIG. 2.

Figure 3:
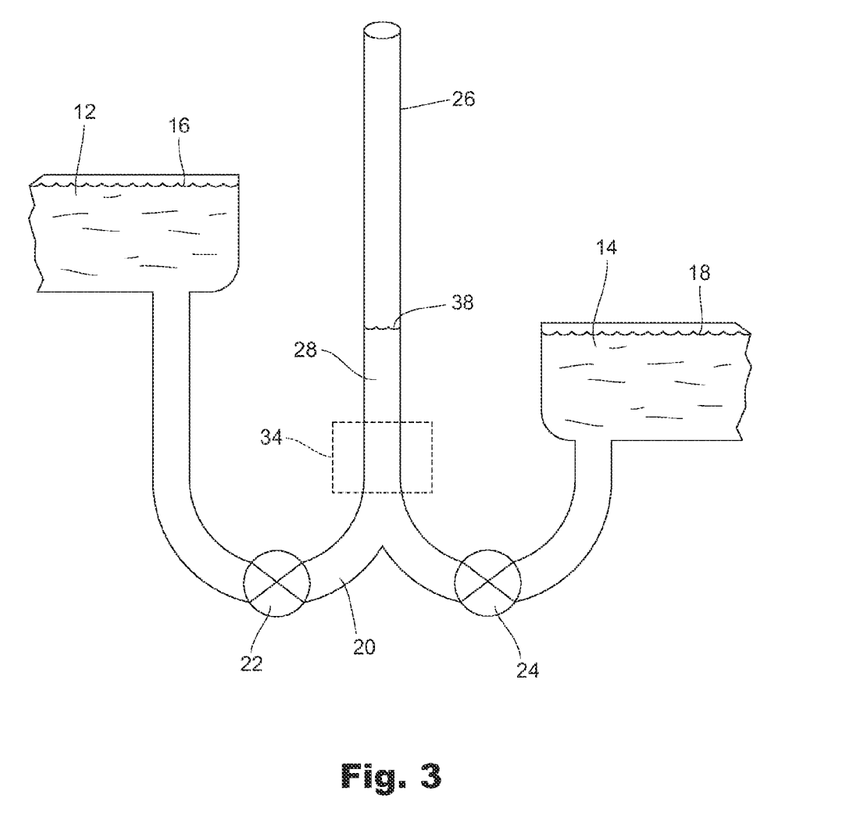
FIG. 3 is a diagram showing the fish passage apparatus of FIG. 1 adapted to optimize power generation instead of fish migration with the water level in the working tube at the water level of the lower body of water.
Figure 4:
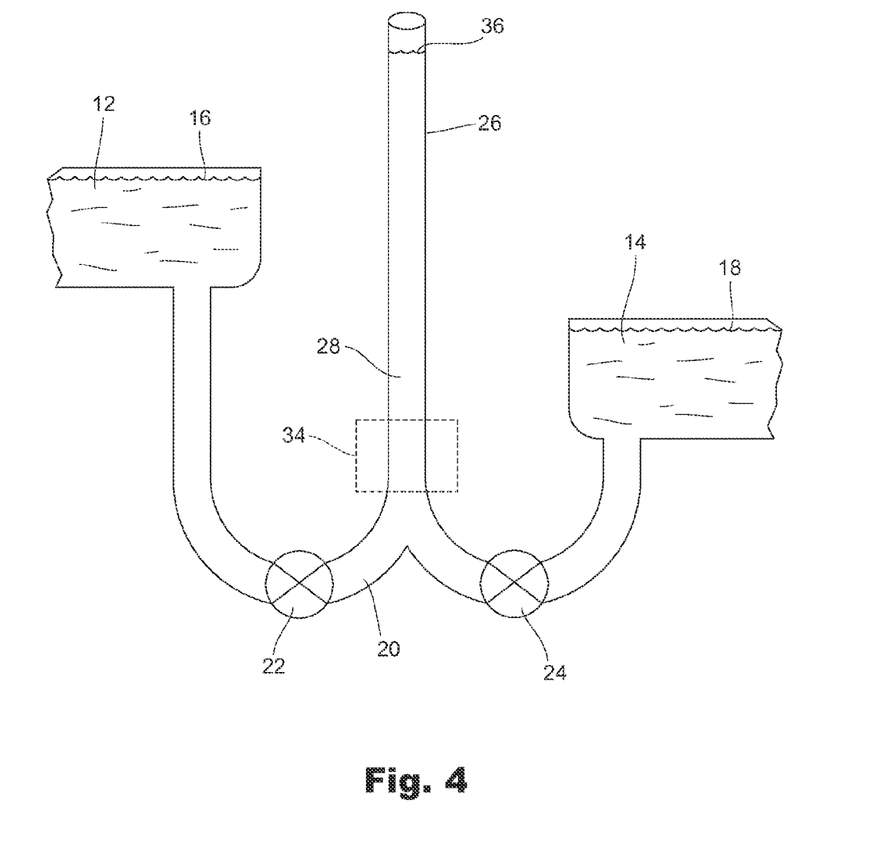
FIG. 4 is a diagram showing the fish passage apparatus of FIG. 1 adapted to optimize power generation instead of fish migration with the water level in the working tube at the water level of the overshoot from water surging from the upper body of water.
Figure 5:
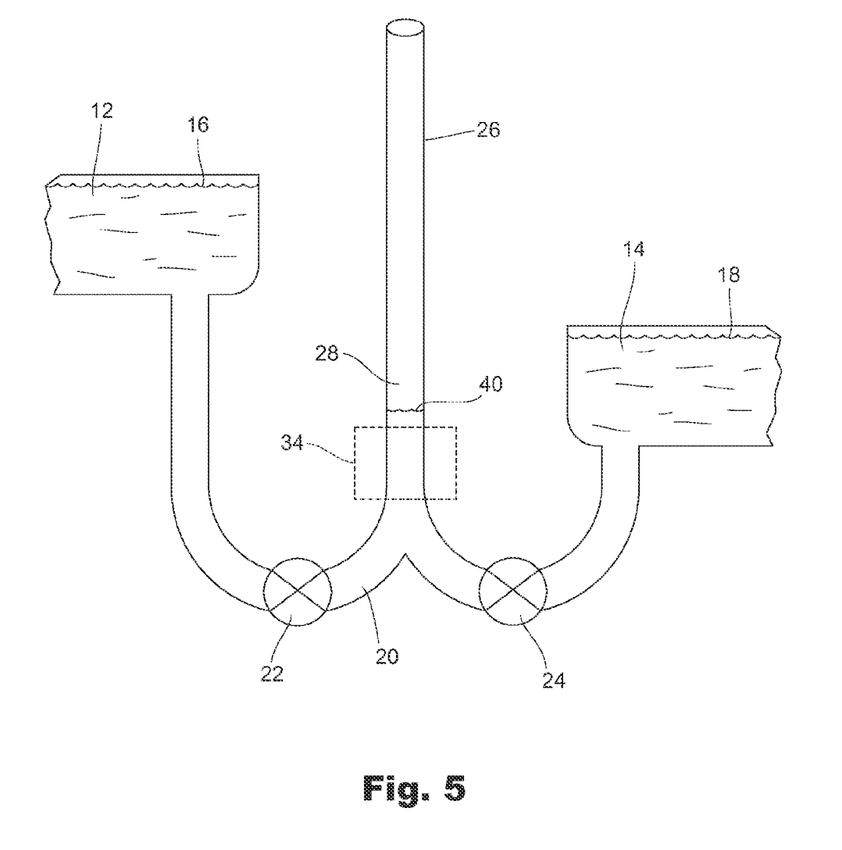
FIG. 5 is a diagram showing the fish passage apparatus of FIG. 1 adapted to optimize power generation instead of fish migration with the water level in the working tube at the water level of the downward overshoot from water surging out of the working tube when the valve at the lower body of water is opened quickly.

As shown in FIG. 3, the power generator 34 may be used without consideration for fish migration between the two bodies of water, that is, with or without accommodations for fish migration, the primary difference being the rate at which the valves 22, 24 open and close and the slope of the connecting tube 20. For power generation, the surface level 38 of the column of water 28, or head, may be maximized. To maximize the head in the column of water 28, the upper valve 22 is such as can be opened sufficiently quickly to result in a surge of water into the working tube 26 such that momentum in said surge of water results in a surface level 38 of the column of water 28 in the working tube 26 that extends upward typically beyond a water level 16 of the upper body of water 12. Similarly, the upper valve 22 is such as may be closed sufficiently quickly to capture and maintain the column of water 28 in the working tube 26 at a desired upper level 36, as shown in FIG. 4. As with the upper valve 22, the lower valve 24 is such as may be closed sufficiently quickly to capture and maintain the column of water 28 in the working tube 26 at a desired lower level 40 after the lower valve 24 is opened with the upper valve 22 closed resulting in a surge of water out of the working tube 26, which desired lower level 40 may be below the water level 18 of the lower body of water 14, as shown in FIG. 5.

Figure 6:
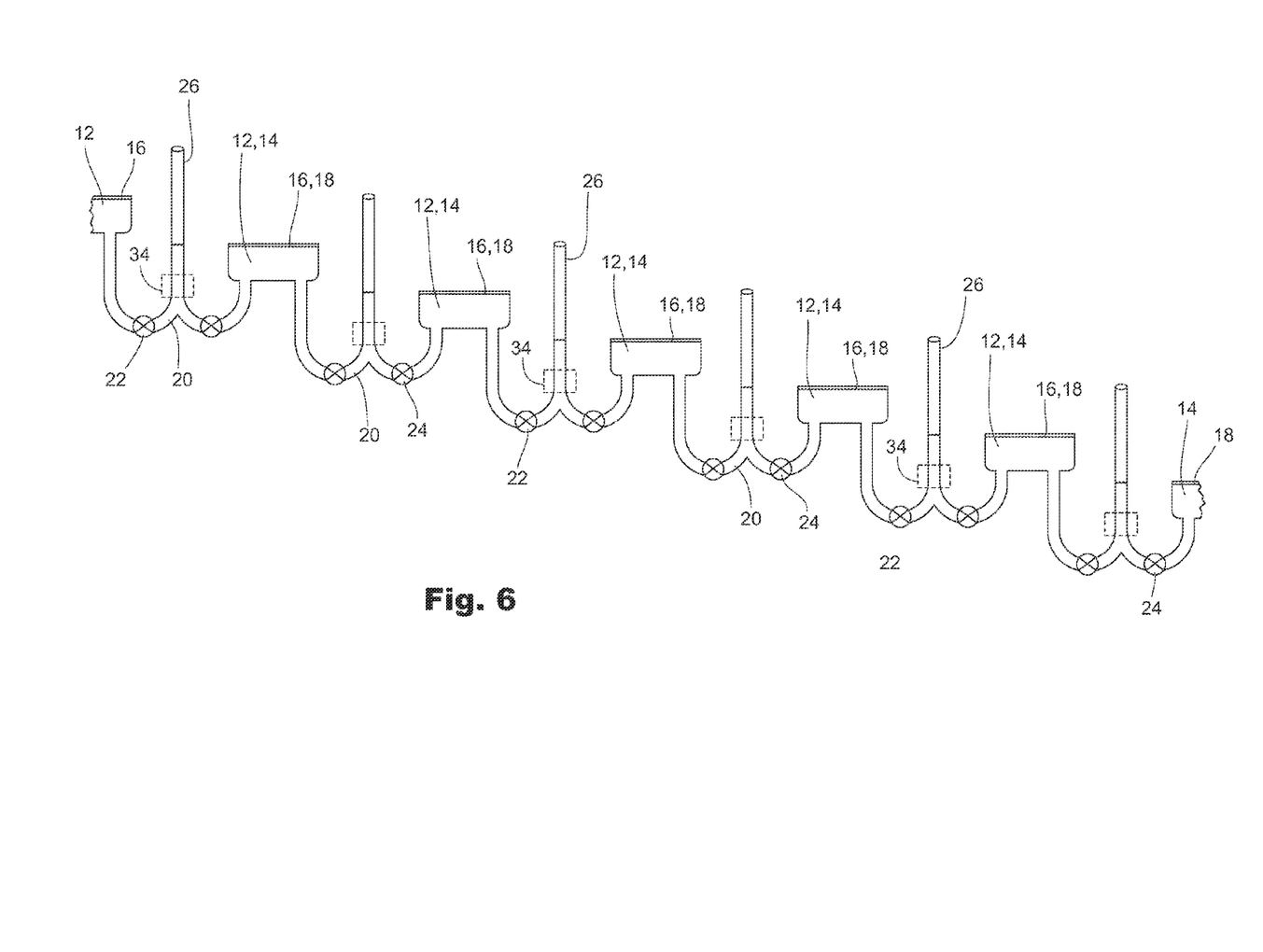
FIG. 6 is a diagram showing a plurality of power generators of FIG. 3 connected in series.

As shown in FIG. 6, as with the fish passage apparatus configuration, a plurality of said power generators also may be combined in series where an upper body of water 12 of one of said plurality of power generators 34 is a lower body of water 14 of a next higher power generator until the final upper body of water 12 is reached.

In use then, electrical power may be generated from potential energy between upper and lower bodies of water 12, 14 and maximized by providing the configuration described above and appropriately quickly opening and closing the upper and lower valves 22, 24 to create and exploit momentum of water flowing into and out of the working tube 26. The cycle of opening and closing the valves 22, 24 as described is then repeated for continual power generation. Power generated may by used to operate the valves and for other purposes. When the configuration is additionally, or solely, used for fish migration between the bodies of water, the speed of the opening and closing of the valves may be reduced to prevent injury to the fish.

Figure 7:
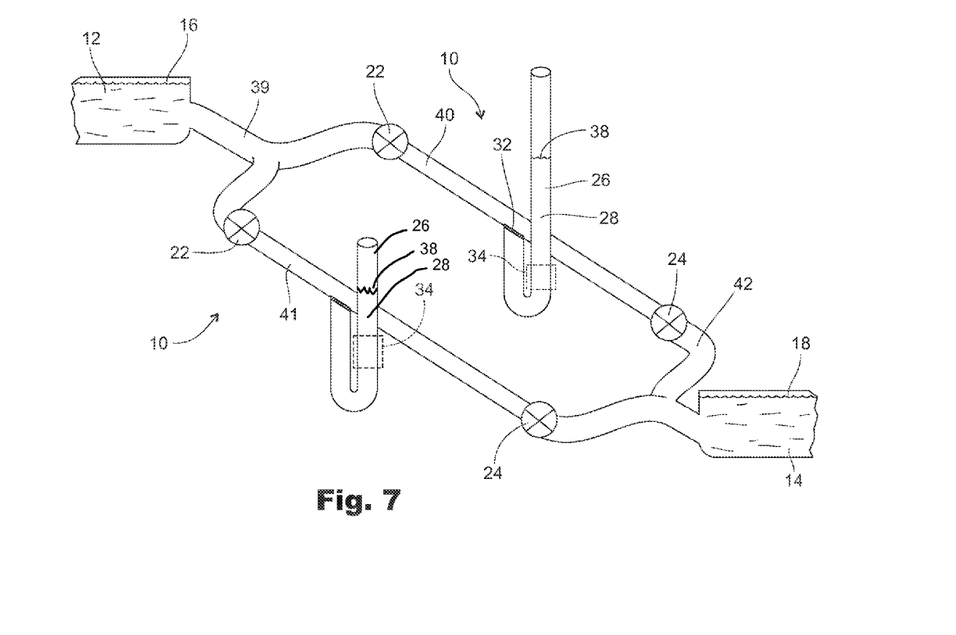
FIG. 7 is a diagram of two fish passage apparatuses in parallel for control of water flow that facilitates fish migration between two bodies of water of different heights, including working tubes that generates power in cooperation with power generators and contributes to moving fish between the bodies of water.
Figure 8:
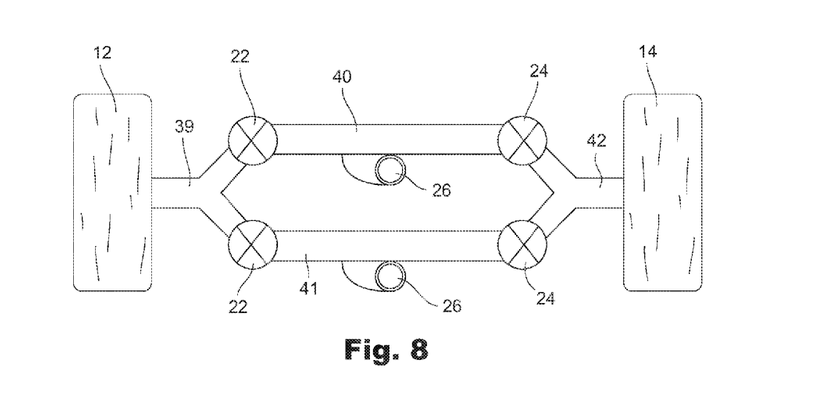
FIG. 8 is a view looking down on the two fish passage apparatuses in parallel.

As further shown in FIG. 7, the fish passage apparatus 10 of the present invention for fish passage between water bodies 12, 14 of different heights with different water levels 16, 18 comprises a left connecting tube 40 and a right connecting tube 41 running in parallel providing fluid communication between upper and lower water bodies 12, 14. Each parallel connecting tube 40, 41 has an upper valve 22 in the connecting tube 20 adapted to control flow of water to or from the upper water body 12, a lower valve 24 in each parallel connecting tube 40, 41 adapted to control flow of water to or from the lower water body 14. Working tubes 26 containing a column of water 28 with a surface level 38 opening into each parallel connecting tube 40, 41 between the upper and lower valves 22, 24 a working portion of which working tube 26 extends functionally vertical to above the water level 16 of the upper water body 12 and to below the water level 18 of the lower water body 14 and is vented at its top such that water can flow freely in and out of the working tubes 26. Screens 30 cover the opening 32 of the working tubes 26 at the junction of tubes 40, 41 and 26 such that fish are prevented from leaving the parallel connecting tubes 40, 41 and entering the working tubes 26.

The upper water body 12 is connected to the parallel connecting tubes 40, 41 through an upper y-joint 39. The upper y-joint 39 has one opening into the upper water body 12 and entering that opening is a nearly constant flow of water.

In left connecting tube 40 the upper valve 22 is opened with the lower valve 24 closed, water flows through the left connecting tube 40 and flows into the working tube 26 raising the surface level 38 of the water column 28 to at least the water level 16 of the upper body of water 12 and allows for fish to enter the left connecting tube 40 from the upper body of water 12. When the upper valve 22 then closes and the lower valve 24 opens, fish may flow with the current from the left connecting tube 40 into the lower y-joint 42 and into the lower body of water 14 as the surface level 38 of the water column 28 in the working tube 26 lowers to at least the water level 18 of the lower body of water 14. Whereupon, the lower valve 24 closes and a new cycle can begin again with the opening of upper valve 22.

In the right connecting tube 41 the upper and lower valves 22, 24 work in nearly exact opposite timing as in left connecting tube 40. When the upper valve 22 in the left connecting tube 40 closes; the upper valve 22 in the right connecting tube 41 opens allowing the water in the upper y-joint 39 to flow nearly continuously into either the right or left connecting tube 40, 41. The right connecting tube 41 operates in the exact same manner as described for left connecting tube 40 except that they are one hundred and eighty degrees out of phase.

Electrical power generators 34 operate in cooperation with the working tubes 26, adapted to extract potential energy from the columns of water 28 in the working tubes 26 as the upper and lower valves 22, 24 are suitably operated; which, for example of a traditional generator, as the column of water 28 falls when the upper valve 22 is closed while the lower valve 24 is opened, or but also alternatively when the upper valve 22 is opened while the lower valve 24 is closed and the column of water 28 rises.

The invention claimed is:

1. A fish passage apparatus for fish passage between water bodies of different heights, comprising, a plurality of connecting tubes providing fluid communication between upper and lower water bodies, a plurality of upper valves in the connecting tubes adapted to control flow of water to or from an upper water body, a plurality of lower valves in the connecting tubes adapted to control flow of water to or from a lower water body, a plurality of working tubes opening into the connecting tubes between the upper and lower valves a working portion of which extends functionally vertical to above a water level of the upper body of water and to below a water level of the lower body and is vented at its top such that water can flow freely in and out of the working portion.

2. The fish passage apparatus of claim 1 wherein fish are prevented from entering the working tubes from the connecting tubes.

3. The fish passage apparatus of claim 1 wherein with the lower valve closed, when the upper valve is opened water flows through the connecting and working tubes raising the water surface level in the working tubes to at least the water level of the upper body of water and fish can enter and exit the connecting tube from the upper body of water while the upper valve is open, and when the upper valve then closes and the lower valve opens, fish may enter and exit the connecting tubes through the lower valve as the water in the working tube lowers to a water level of at least that of the lower body of water.

4. The fish passage apparatus of claim 1 wherein with the upper valve closed, when the lower valve is opened water flows out of the working tube to at least the water level of the lower body of water and fish can enter the connecting tube from the lower body of water and when the lower valve then closes and the upper valve opens, fish may swim upstream through and out of the connecting tube into the upper body of water.

5. The fish passage apparatus of claim 1 further comprising an electrical power generator operating in cooperation with the working tube adapted to extract potential energy from a column of water in the working tube as the column of water moves when the upper and lower valves are suitably operated.

6. The fish passage apparatus of claim 1 comprising two of said fish passage apparatuses in parallel wherein, the right connecting tube upper and lower valves work in nearly exact opposite timing as in left connecting tube upper and lower valves, allowing the water in an upper and a lower y-joint to flow nearly continuously into either the right or left connecting tube.

7. The fish passage apparatus of claim 6 wherein, the upper valve in the left connecting tube closes in close temporal proximity to the opening of the upper valve in the right connecting tube and the right connecting tube operates in the exact same manner as the left connecting tube except that they are one hundred and eighty degrees out of phase.

8. The fish passage apparatus of claim 1 comprising a plurality of said fish passage apparatuses in parallel wherein, the connecting tube upper and lower valves are timed to work in harmony such that water is flowing into at least one connecting tube at any moment and out of one connecting tube at any moment, allowing the water in an upper and lower y-joints to flow nearly continuously.

9. The fish passage apparatus of claim 8 wherein, the connecting tubes operate in the exact same except that they are out of phase proportional to the quantity of connecting tubes.

10. The method of providing a fish passage between upper and lower bodies of water, comprising the following steps:

a. providing at least two connecting tubes, a right connecting tube and a left connecting tube, that provide fluid communication between upper and lower water bodies, an upper valve in each connecting tube adapted to control flow of water to or from an upper water body, a lower valve in each connecting tube adapted to control flow of water to or from a lower water body, a working tube opening into each connecting tube between the upper and lower valves a working portion of which extends functionally vertical to above a water level of the upper body of water and is vented at its top such that water can flow freely in and out of the working portion;

b. with the upper and lower valves closed in the left connecting tube, opening the upper valve in the left connecting tube sufficiently quickly to result in a surge of water into the connecting tube and into the working tube such that momentum in said surge of water results in an oscillating column of water in the working tube and therein establishing an upper fish migration condition during which condition fish may swim upward through the connecting tube and into the upper body of water or fish may swim or follow the current from the upper body of water into the connecting tube and in close temporal proximity closing the upper valve in the right connecting tube;

c. closing the upper valve in the left connecting tube to end the upper fish migration condition and maintain the column of water at a desired upper level in the working tube and in close temporal proximity opening the lower valve in the right connecting tube to continue the fish migration and not allow the fish to turn around;

d. with the upper valve closed in the left connecting tube, opening the lower valve of the same tube to allow water to flow out of the working tube with the water level in the working tube stabilizing at the water level of the lower body of water therein establishing a lower fish migration condition and in close temporal proximity closing the lower valve on the right connecting tube and opening the upper valve in the right connecting tube to build up a column of water in a right working tube;

e. maintaining the lower fish migration condition in the left connecting tube a desired period of time to allow fish migrating downstream to exit the connection tube at its lower end or to allow fish migrating upstream to enter the connection tube at its lower end, simultaneously fish are entering or exiting the open upper valve of the right connecting tube;

f. closing the lower valve on the left connecting tube;

g. repeating steps a through g.

11. The method of claim 10 with the additional step of generating electrical power from the movement of the water in the working tube.

12. The method of claim 11 wherein electrical power is generated from upward movement of the water in the working tube or from downward movement of the water in the working tube or both.

13. The method of claim 10 wherein, opening the upper valve of one connecting tube is nearly simultaneous with closing the upper valve in the other connecting tube.

14. The method of claim 10 wherein, opening the lower valve of one connecting tube is nearly simultaneous with closing the lower valve in the other connecting tube.

* * * * *